(12) United States Patent
Walter

(10) Patent No.: US 9,304,267 B2
(45) Date of Patent: Apr. 5, 2016

(54) METHOD AND APPARATUS FOR OPTICAL COUPLING AND OPTO-ELECTRONIC CONVERSION

(71) Applicant: Quantum Electro Opto Systems Sdn. Bhd., Melaka (MY)

(72) Inventor: Gabriel Walter, Madison, WI (US)

(73) Assignee: Quantum Electro Opto Systems Sdn. Bhd., Melaka (MY)

( * ) Notice: Subject to any disclaimer, the term of this patent is extended or adjusted under 35 U.S.C. 154(b) by 0 days.

(21) Appl. No.: 14/022,733

(22) Filed: Sep. 10, 2013

(65) Prior Publication Data

US 2014/0086589 A1 Mar. 27, 2014

Related U.S. Application Data

(60) Provisional application No. 61/743,746, filed on Sep. 11, 2012.

(51) Int. Cl.
G02B 6/42 (2006.01)
H04B 10/25 (2013.01)
H04B 10/80 (2013.01)

(52) U.S. Cl.
CPC ............ *G02B 6/4212* (2013.01); *G02B 6/4204* (2013.01); *H04B 10/25* (2013.01); *H04B 10/801* (2013.01)

(58) Field of Classification Search
None
See application file for complete search history.

(56) References Cited

U.S. PATENT DOCUMENTS

| | | | | |
|---|---|---|---|---|
| 4,045,120 A | * | 8/1977 | de Corlieu et al. | 385/31 |
| 4,355,321 A | * | 10/1982 | Yeats | 257/434 |
| 5,202,553 A | | 4/1993 | Geller | 250/214 |
| 5,420,953 A | * | 5/1995 | Boudreau et al. | 385/88 |
| 5,875,274 A | * | 2/1999 | Stein | 385/49 |
| 6,456,761 B2 | * | 9/2002 | Yap et al. | 385/33 |
| 6,717,753 B2 | * | 4/2004 | Sasaki | 359/819 |
| 6,727,530 B1 | | 4/2004 | Shen et al. | 257/184 |
| 6,965,714 B2 | * | 11/2005 | Brock et al. | 385/33 |
| 7,091,082 B2 | | 8/2006 | Feng et al. | 438/235 |
| 7,286,583 B2 | | 10/2007 | Feng et al. | 372/30 |
| 7,354,780 B2 | | 4/2008 | Feng et al. | 257/292 |
| 7,535,034 B2 | | 5/2009 | Walter et al. | 372/43 |
| 7,693,195 B2 | | 4/2010 | Feng et al. | 372/30 |
| 7,696,536 B1 | | 4/2010 | Feng et al. | 257/197 |
| 7,711,015 B2 | | 5/2010 | Holonyak et al. | 372/11 |
| 7,813,396 B2 | | 10/2010 | Feng et al. | 372/43.01 |
| 7,888,199 B2 | | 2/2011 | Walter et al. | 438/235 |
| 7,888,625 B2 | | 2/2011 | Holonyak et al. | 250/214 |

(Continued)

FOREIGN PATENT DOCUMENTS

| | | | | | |
|---|---|---|---|---|---|
| JP | | 4-98204 A | * | 3/1992 | G02B 6/32 |
| JP | | 10-117012 A | * | 5/1998 | H01L 31/10 |
| JP | | 2009-198908 A | * | 9/2009 | G02B 6/42 |

*Primary Examiner* — Mike Stahl
(74) *Attorney, Agent, or Firm* — Martin Novack

(57) ABSTRACT

A method for converting an optical signal, propagating in an optical fiber, into an electrical output signal, including the following steps: providing an optical interface having opposing flat surfaces and being formed of a material having a refractive index that is substantially higher than the refractive index of the optical fiber; disposing a first of the opposing flat surfaces of the interface adjacent an output end of the optical fiber, and disposing a photodetector adjacent a second of the opposing flat surfaces of the interface; whereby the optical signal is coupled into the photodetector and converted by the photodetector into an electrical output signal.

5 Claims, 5 Drawing Sheets

(56) References Cited

U.S. PATENT DOCUMENTS

| | | | |
|---|---|---|---|
| 7,998,807 B2 | 8/2011 | Feng et al. | 438/235 |
| 8,005,124 B2 | 8/2011 | Then et al. | 372/46.011 |
| 8,179,937 B2 | 5/2012 | Walter et al. | 372/38.05 |
| 8,179,939 B2 | 5/2012 | Holonyak et al. | 372/43.01 |
| 8,494,375 B2 | 7/2013 | Walter | 398/183 |
| 2001/0024549 A1 | 9/2001 | Takahashi et al. | 385/49 |
| 2002/0054737 A1* | 5/2002 | Jian | 385/49 |
| 2002/0098609 A1* | 7/2002 | Ono et al. | 438/31 |
| 2004/0086231 A1* | 5/2004 | Fukuyama et al. | 385/49 |
| 2005/0040387 A1 | 2/2005 | Feng et al. | 257/14 |
| 2005/0040432 A1 | 2/2005 | Feng et al. | 257/198 |
| 2005/0053334 A1 | 3/2005 | Miao et al. | 385/49 |
| 2005/0054172 A1 | 3/2005 | Feng et al. | 438/313 |
| 2005/0129367 A1 | 6/2005 | Koshinz et al. | 385/42 |
| 2006/0208290 A1 | 9/2006 | Feng et al. | 257/292 |
| 2008/0089368 A1 | 4/2008 | Feng et al. | 372/25 |
| 2008/0240173 A1 | 10/2008 | Holonyak et al. | 372/9 |
| 2009/0008734 A1* | 1/2009 | Furuyama | 257/435 |
| 2009/0134939 A1 | 5/2009 | Feng et al. | 327/581 |
| 2010/0034228 A1 | 2/2010 | Holonyak et al. | 374/45 |
| 2010/0073086 A1 | 3/2010 | Holonyak et al. | 330/149 |
| 2010/0085995 A1 | 4/2010 | Feng et al. | 372/43.01 |
| 2010/0103971 A1 | 4/2010 | Then et al. | 372/45.01 |
| 2010/0202483 A1 | 8/2010 | Walter et al. | 372/45.01 |
| 2010/0202484 A1 | 8/2010 | Holonyak et al. | 372/45.01 |
| 2010/0265983 A1* | 10/2010 | Adachi et al. | 372/50.23 |
| 2010/0272140 A1 | 10/2010 | Walter et al. | 372/38.02 |
| 2010/0289427 A1 | 11/2010 | Walter et al. | 315/219 |
| 2010/0315018 A1 | 12/2010 | Then et al. | 315/291 |
| 2011/0103740 A1* | 5/2011 | Shacklette | 385/22 |
| 2011/0150487 A1 | 6/2011 | Walter | 398/115 |
| 2012/0001166 A1* | 1/2012 | Doany et al. | 257/43 |
| 2012/0068151 A1 | 3/2012 | Walter | 257/9 |
| 2012/0068207 A1 | 3/2012 | Hata et al. | 257/94 |
| 2012/0133809 A1* | 5/2012 | Yamada | 348/294 |

* cited by examiner

| Diameter (μm) of Detector Active Area | Coupled Power (μW) | % of Coupled Power |
|---|---|---|
| 45 | 9.7619 | 73.10% |
| 50 | 11.026 | 82.57% |
| 55 | 11.847 | 88.71% |
| 60 | 12.378 | 92.69% |
| 65 | 12.986 | 97.24% |
| 70 | 13.225 | 99.03% |
| 75 | 13.225 | 99.03% |
| 80 | 13.225 | 99.03% |
| 85 | 13.225 | 99.03% |

FIG. 6

METHOD AND APPARATUS FOR OPTICAL COUPLING AND OPTO-ELECTRONIC CONVERSION

PRIORITY CLAIM

Priority is claimed from U.S. Provisional Patent Application No. 61/743,746, filed Sep. 11, 2012, and said Provisional patent application is incorporated herein by reference.

FIELD OF THE INVENTION

This invention relates to the field of optical communication and, more particularly to optical coupling techniques and equipment for use in conjunction with optical interconnects.

BACKGROUND OF THE INVENTION

The U.S. Patent Application Publication No. US2011/0150487, assigned to the same assignee as the present application, discloses an optical interconnect for high speed optical communication. As described in the Publication, the disclosed interconnect has application for use in establishing a communication link between a first location and a second location, the first location having an electrical driver circuit that receives input data to be communicated, and the second location having an electrical receiver circuit for producing output data representative of the input data. The method includes the following steps: providing a tilted charge light emitting device at the first location and coupled with the driver circuit such that the light produced by the tilted charge light-emitting device is a function of the input data; providing an optical fiber between the first and second locations; coupling light from the tilted charge light emitting device into the optical fiber; and providing, at the second location, a photodetector coupled with the optical fiber and with the receiver circuit; whereby electrical signals representative of the input data are output from the receiver circuit.

At the receiver circuit of such an optical interconnect system, it is necessary to couple the optical signal from the output end of an optical fiber cable into an optical detector, typically a semiconductor photodetector, that converts the optical signal into an electrical signal. It is, of course, advantageous to perform this coupling with high efficiency; that is, with minimal loss of the light leaving the output end of the optical fiber. A problem in the art, however, is that achievement of high efficiency coupling can substantially increase the cost of the receiver subassembly, which is unacceptable when striving to achieve a relatively inexpensive optical interconnect that is suitable for widespread use in communication applications.

There are a number of cost components involved when attempting to implement an efficient optical coupling technique. Initially, it can be noted that the relative sizes (typically diameters) of the optical fiber and the photodetector active area may not be well matched and may vary for different types of optical interconnects. One such cost component is the cost of the optical coupling element itself, for example a lens for focusing light output from the fiber into the photodetector active region. Another component of cost relates to the assembly process, including positioning, aligning, and securing the optical coupling component in place, and doing so without compromising the ultimate optical coupling efficiency of the assembly.

Examples of prior art approaches are shown in FIGS. 1 and 2. Both of these Figures show a receptacle 120 in which is mounted the output end of an optical fiber comprising a core 105 and cladding 108. A lens element 190 focuses light output from the fiber onto a photodetector. In FIG. 1, the light is focused on the backside of a photodetector 180 on a substrate 182. In FIG. 2, the light is focused on the frontside of a photodetector 183 on substrate 182. (The photodetector electrical output is not separately shown.) As illustrated, the prior art can involve the use of relatively large lens or lenses in order to couple light emitted from a fiber onto a photodetector. The lenses are usually constructed of plastic with an index of refraction similar to that of the fiber. Precision is required during assembly to match the separation of the device and the focal length of the lens. Furthermore, the difficulty of constructing a precise curved surface contributes to higher cost of the lenses.

It is among the objects of the present invention to address the drawbacks and limitations of prior art approaches, as described.

SUMMARY OF THE INVENTION

Applicant has discovered that an elegant technique of employing an easy-to-use flat optical interface can provide a refractive focusing effect and can achieve the objective of high optical coupling efficiency, while also meeting the objectives of non-complex assembly and low cost that are ideal for optical interconnects which are suitable for widespread inexpensive communication applications.

In accordance with a form of the invention, a method is set forth for converting an optical signal, propagating in an optical fiber (that is, as used herein, the fiber core for a typical cladded fiber), into an electrical output signal, including the following steps: providing an optical interface having opposing flat surfaces and being formed of a material having a refractive index that is substantially higher than the refractive index of said optical fiber; disposing a first of the opposing flat surfaces of said interface adjacent an output end of said optical fiber, and disposing a photodetector adjacent a second of the opposing flat surfaces of said interface; whereby said optical signal is coupled into said photodetector and converted by said photodetector into an electrical output signal.

In an embodiment of this form of the invention, said step of providing said optical interface comprises providing an interface formed of a material having an index of refraction that is at least twenty percent higher than the index of refraction of the optical fiber. In a preferred form of this embodiment, said optical fiber has an index of refraction of about 1.5, and said step of providing said optical interface comprises providing an optically transparent interface formed of a material having an index of refraction of about 3.1. In this embodiment, the optical interface is formed of InP. Examples of alternative materials include, without limitation, Si, GaAs, GaN, GaP, and ZnSe. Also in this embodiment, an anti-reflection layer is provided between the output end of said optical fiber and the first of said opposing flat surfaces of said interface. Also in this embodiment, said step of disposing a photodetector adjacent a second of the opposing flat surfaces of said interface includes depositing a semiconductor photodetector on said second of said opposing flat surfaces of said interface. The photodetector may also, for example, be bonded on said second of said surfaces.

In accordance with a further form of the invention, an optical receiver subsystem is set forth for receiving an optical signal, propagating in an optical fiber, and converting said optical signal into an electrical output signal, comprising: an optical interface having opposing flat surfaces and being formed of a material having a refractive index that is substantially higher than the refractive index of said optical fiber; a first of the opposing flat surfaces of said interface being disposed adjacent an output end of said optical fiber; and a photodetector adjacent a second of the opposing flat surfaces of said interface; whereby said optical signal is coupled into said photodetector and converted by said photodetector into an electrical output signal.

Further features and advantages of the invention will become more readily apparent from the following detailed description when taken in conjunction with the accompanying drawings.

Figure 4:
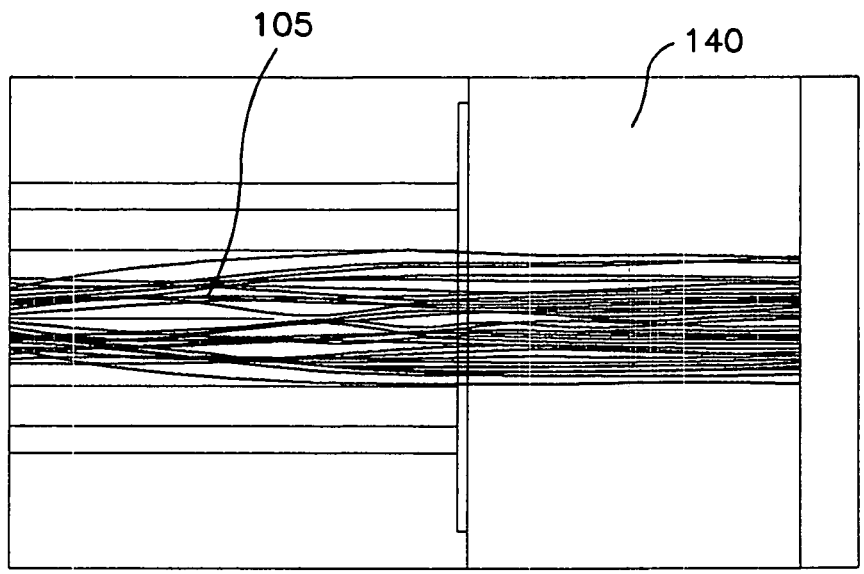
FIG. 4 shows a simulation of the structure of FIG. 3 using optical Zemax software. A coupling efficiency of ~88% was achieved when AR coating was not used. Coupling efficiency was improved to 99% when an appropriate AR coating was applied to the HDII surface coupled to the optical fiber.
Figure 5:
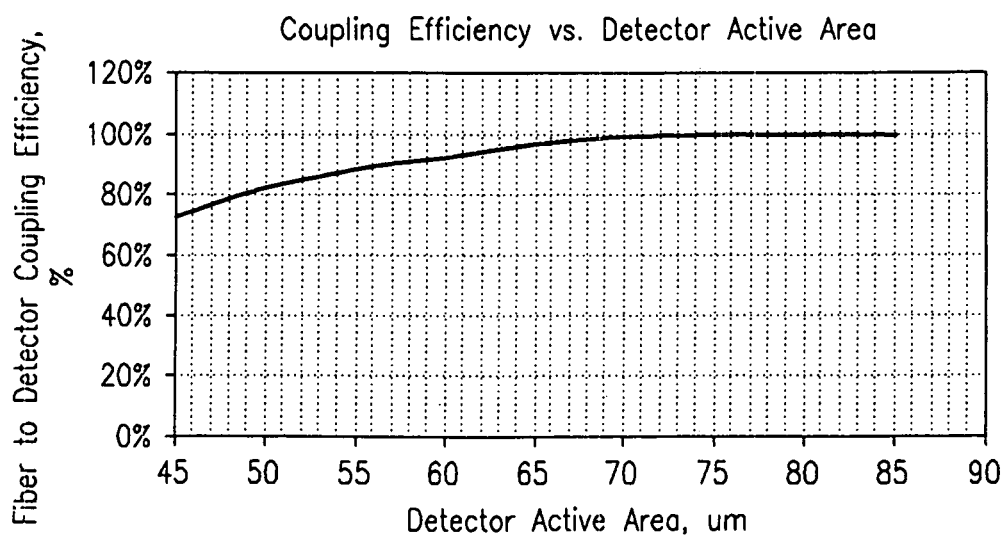
FIG. 5 is a graph of optical coupling efficiency for the example of FIGS. 3 and 4, from the 62.5 um diameter fiber with NA of 0.3 into a photodetector, as a function of detector active area, with said area being varied from 45 um to 85 um diameters. The graphed simulation results indicate that coupling efficiencies of more than 80% could be achieved even when the photodetector active area is substantially smaller, ~40% smaller, (~49 um active region diameter vs 62.5 um core diameter) than the core area of the fiber waveguide.

For the example of FIGS. 4 and 5, with the 62.5 um core diameter fiber emitting 13.35 μw of optical power, the table of FIG. 6 lists, in the center column, the power, in microwatts, that is coupled into the photodetector for each of the photodetector active areas listed in the lefthand column. The righthand column lists the percentage of power coupled into the photodetector.

Figure 7:
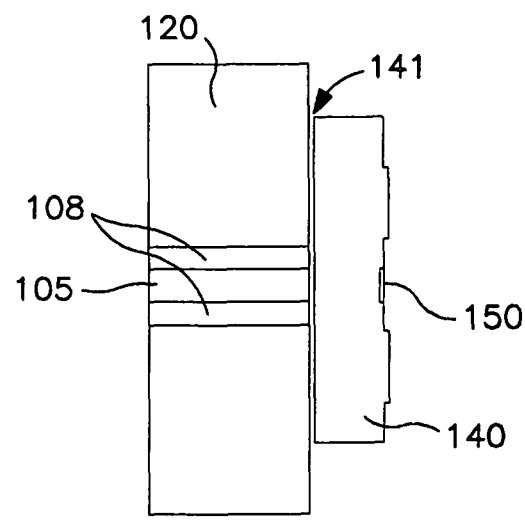

FIG. 7 illustrates an embodiment of the invention wherein the fiber is mechanically pressed against the anti-reflection (AR) coated surface of the high differential index interface (HDII). This results in an air gap of approximately 5 um. The use of a mechanical method reduces cost by reducing complexity of assembly when compared to use of epoxy which requires additional assembly steps including curing.

Figure 8A:
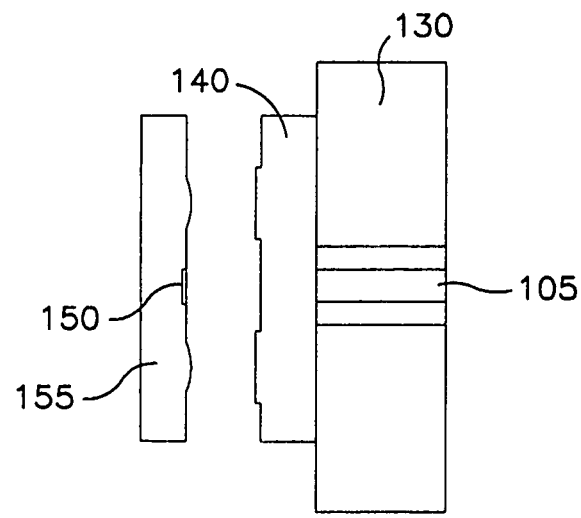

FIGS. 8A (partially exploded) and 8B illustrate a further embodiment wherein the HDII is coupled electrically and optically to the front side of the photodetector.

DETAILED DESCRIPTION

The refractive index n of an optical medium is a dimensionless number that describes how radiation, such as light, propagates through the medium. It is defined as $n=c/v$, where c is the speed of light in a vacuum and v is the speed of light in the medium. When optical waves enter from a medium of one index, n1, to another medium of a second index n2, it experiences two optical phenomenon described by Snell's Law of refraction and Fresnel's Law of reflection.

According to Snell's Law:

$$n_1 \sin\theta_1 = n_2 \sin\theta_2$$

When an optical wave traverses a medium with refractive index of n1, and a propagation angle of $\theta_1$ (relative to surface normal) enters another medium of a second refractive index, $n_2$, the resulting propagation angle $\theta_2$ is given by above equation.

For example, for $\theta_1=17.45°$, $n_1=1$, and $n_2=3.1$, the resulting propagating angle in medium 2, is 5.55°. The relatively high index region could accordingly be utilized to reduce the propagating angle (less diverging or less converging) of an optical wave.

Also, according to the Fresnel Law, when an optical wave propagating in a medium with index, n1, and a propagation angle of $\theta_1$ enters another medium of a second index, $n_2$, some of the optical wave is reflected. To significantly reduce Fresnel reflection, the surface can be coated with an appropriate anti-reflective (AR) coating.

In accordance with a feature of an embodiment of the invention, a flat high differential index interface (HDII) is coupled to the optical waveguide (optical fiber) on one side, and the other side is coupled to a photodetector. The photodetector has an active region area that can be significantly smaller (up to 40% smaller) or larger than the area of the waveguide core region. The flat surface of the HDII also simplifies the assembly process by allowing self-alignment of the tilt axis between the waveguide emission axis and the photodetector detection axis.

Figure 3:
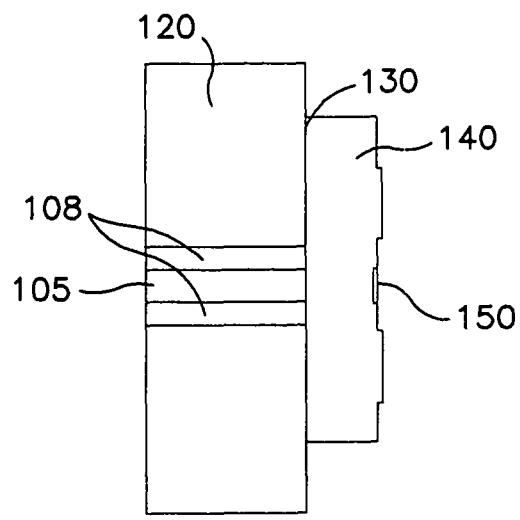
FIG. 3 is a diagram illustrating, in cross-section, a fiber to detector coupling mechanism with a high differential index interface (HDII) in accordance with an embodiment of the invention and which can be used in practicing an embodiment of the method of the invention. The flat surfaces of the HDII allows the self-alignment of respective axis of light emission and light detection.

In the example of the embodiment of FIG. 3, there is shown the output end of a fiber optic cable mounted in a receptacle 120. The fiber optic waveguide conventionally comprises a core 105 within cladding 108. The core 105 has a refractive index of ~1.5, core diameter of 62.5 um and a numerical aperture (NA) of 0.3 and is coupled, using a transparent epoxy material 130 (n~1.5, and thickness of ~5 um) to one surface of a 150 um thick InP HDII 140 with a refractive index of 3.1. The opposing surface of the HDII is coupled to the backside of a 2 um thick photodetector 150 with an active area diameter, in this example, of 85 um. The photodetector can be deposited on the HDII 130, such as by known metal organic chemical vapor deposition (MOCVD) technique. Alternatively, the photodetector can be bonded to the HDII. The flat surface of the HDII allows the self-alignment of respective axes of light emission and light detection.

Optical coupling efficiency for this example was determined using ZEMAX optical software to perform a simulation (see e.g. R. Fisher et al., Optical System Design, McGraw Hill, 2008). An optical coupling efficiency of ~88% from fiber to the active area of the photodetector is achieved, with most of the losses stemming from Fresnel losses associated with the difference in the index of refraction between fiber and HDII. When an appropriate antireflective coating is applied to the surface of the InP HDII coupled to the optical fiber, the coupling efficiency is further improved to ~99%. The result of the structural simulation using the ZEMAX software is shown in FIG. 4.

Figure 1:
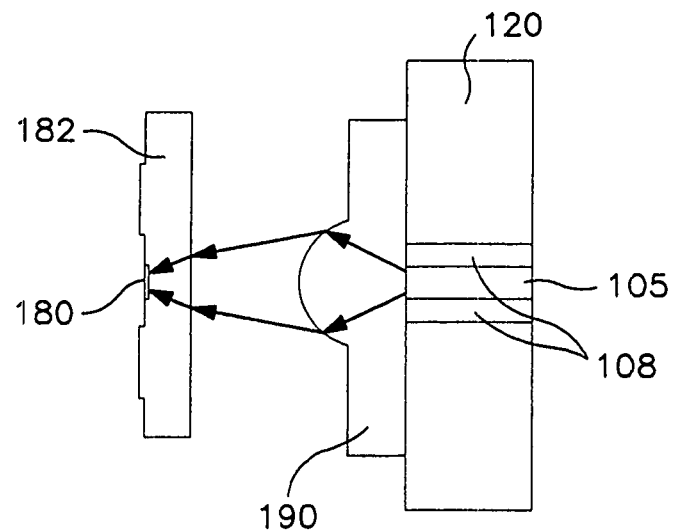
FIGS. 1 and 2 are diagrams showing operation of a prior art fiber optical receiver assembly using a conventional lens. interface
Figure 2:
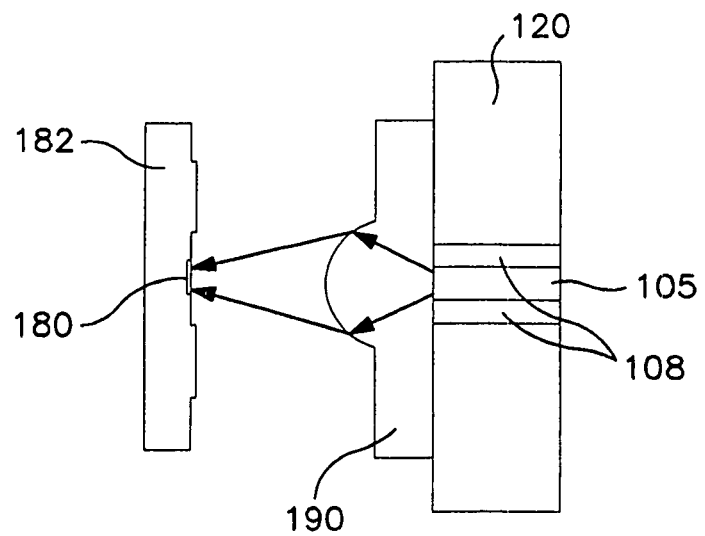

FIG. 5 is a graph of optical coupling efficiency for the example of FIGS. 1 and 2, from the 62.5 um diameter fiber with NA of 0.3 into a photodetector, as a function of detector active area, with said area being varied from 45 um to 85 um diameters. The graphed simulation results indicate that coupling efficiencies of more than 80% could be achieved even when the photodetector active area is substantially smaller, ~40% smaller (~49 um active region diameter vs 62.5 um core diameter), than the core area of fiber waveguide.

For the same example, with the 62.5 um core diameter fiber emitting 13.35 μw of optical power, the table of FIG. 6 lists, in the center column, the power, in microwatts, that is coupled into the photodetector for each of the photodetector active areas listed in the lefthand column. The righthand column lists the percentage of power coupled into the photodetector.

FIG. 7 illustrates an embodiment wherein the fiber is mechanically pressed against the anti-reflection (AR) coated surface of the high differential index interface (HDII) 140. This results in an air gap (indicated at 141) of approximately 5 um. Air has an index of refraction of 1. The use of a mechanical method (which can include a housing, not shown) reduces cost by reducing complexity of assembly when compared to use of epoxy which requires additional assembly steps including curing. Simulation using the ZEMAX software indicates that a coupling efficiency of ~94.5% could still be achieved. Coupling efficiency could further be improved to 99% by applying an appropriate AR coating on the surface of the fiber.

Figure 8B:
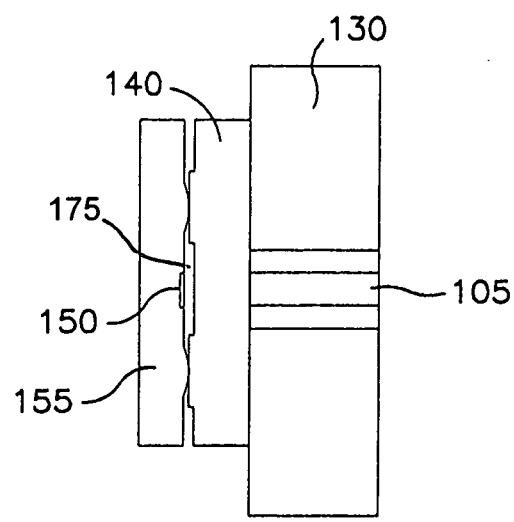

In a further embodiment, illustrated in FIGS. 8A and 8B, the HDII is coupled electrically and optically to the front side of the photodetector. The appropriate anti-reflective coatings are applied to both sides of the HDII and also to the front side of the photodetector. Patterned metallization (not separately shown) can be deposited on top of the HDII to electrically couple to the photodetector (output not separately shown) and can be used to integrate other components. As seen in FIGS. 8A and 8B, in this embodiment, the photodetector 150 is deposited or mounted on a substrate 155. When the substrate is coupled to the HDII, the gap 175 in the recess (within the bonding material) between the photodetector and the HDII can be left as air or be epoxy filled.

The invention claimed is:

1. A method for converting an optical signal, propagating in an optical fiber, having a core with an index of refraction of about 1.5, into an electrical output signal, comprising the steps of:

providing an optical interface having opposing flat surfaces and being formed of an optically transparent material having an index of refraction of about 3.1;

disposing a first of the opposing flat surfaces of said interface adjacent an output end of said optical fiber that is orthogonal to the fiber axis, and disposing a photodetector adjacent a second of the opposing flat surfaces of said interface; and securing said optical interface to said fiber with an epoxy having an index of refraction of about 1.5;

whereby said optical signal is focused and coupled into said photodetector and converted by said photodetector into an electrical output signal.

2. The method as defined by claim 1, wherein said step of providing said optical interface comprises providing an interface formed of InP.

3. The method as defined by claim 1, wherein said step of disposing a photodetector adjacent a second of the opposing flat surfaces of said interface includes depositing a semiconductor photodetector on said second of said opposing surfaces of said interface.

4. The method as defined by claim 1, wherein said step of disposing a photodetector adjacent a second of the opposing flat surfaces of said interface includes bonding a semiconductor photodetector on said second of said opposing surfaces of said interface.

5. The method as defined by claim 1, further comprising providing a metalization pattern on said second of said opposing surfaces of said optical interface, and electrically coupling said photodetector with said metalization pattern.

* * * * *